3,183,257
PREPARATION OF N-SUBSTITUTED
PHOSPHORAMIDOTHIOATES
Bernard Miller, Princeton, and Thomas P. O'Leary, Jr., Cranbury, N.J., assignors to American Cyanamid Company, Stamford, Conn., a corporation of Maine
No Drawing. Filed Apr. 20, 1962, Ser. No. 188,970
11 Claims. (Cl. 260—461)

The present invention relates to a novel process for preparing certain N-substituted phosphoramidothioates. More particularly, it relates to the alkylation of certain N-unsubstituted phosphoramidothioates to prepare the corresponding N-alkylated phosphoramidothioates.

It is known that in the alkylation of either thioamides or phosphorothioates, alkylation occurs preferentially on the sulfur atom probably due to the high nucleophilicity of the thiol anion. Thus, the alkylation of thioamides produces S-alkyl thioimides rather than N-alkyl thioamides. In the alkylation of phosphorothioates, only the S-alkyl phosphorothioates are prepared. Alkylation affects the thiol anion rather than any other group in the molecule similarly capable of being alkylated. If the nitrogen atom rather than the sulfur atom could be affected in phosphoramidothioates by alkylation, such a process would be highly desirable as providing an economical and straightforward technique for obtaining agricultural pesticidal reagents.

It is, therefore, a principal object of the present invention to provide a process for directly alkylating the nitrogen atom to the exclusion of the sulfur atom in phosphoramidothioates. It is a further object to provide a process for the N-substitution of N-unsubstituted phosphoramidothioates in a non-acidic environment. Other objects and advantages will become apparent from a consideration of the ensuing detailed description.

To this end, it has been unexpectedly found that, in the presence of certain strong bases, the alkylation of phosphoramidothioates occurs on the nitrogen atom rather than on the sulfur atom. Thus, when utilizing organic bases in the presence of a suitable inert solvent, N-alkylated phosphoramidothioates are prepared in a swift, straightforward manner.

According to the process of the invention, a phosphoramidothioate can be readily alkylated to form N-alkylated phosphoramidothioates by dissolving about one mol of an N-unsubstituted phosphoramidothioate in a suitable solvent and admixing therewith approximately equimolar quantities of a strong base and an alkylating agent. The reaction which occurs may be graphically written as follows:

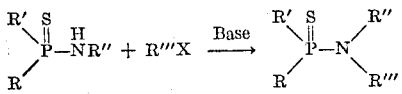

where R and R′ each are: lower alkyl, lower alkoxy or aryloxy; R″ is: H, lower alkyl or aryl; R‴ is: the radical represented by lower alkyl, lower alkenyl, aralkyl, carbonyl-substituted alkyl, or halo-substituted lower alkyl; and X is: halide, sulfonate or sulfate, said halide being chloride, iodide or bromide. Advantageously, the reaction occurs over a wide range of temperatures, usually between about 20° C. and below the boiling point of the inert solvent, and preferably at room temperature.

Illustrative N-unsubstituted phosphoramidothioates to be alkylated are:

O,O-dimethyl-N-phenyl phosphoramidothioate,
O,O,-diethyl-N-phenyl phosphoramidothioate,
O,O-di-n-propyl-N-methyl phosphoramidothioate,
O,O-diethyl-N-methyl phosphoramidothioate,
O,O-diethyl phosphoramidothioate,
O,O-diphenyl-N-methyl phosphoramidothioate,
O,O-di-naphthyl-N-phenyl phosphoramidothioate,
N-phenyl dimethyl phosphinoamidothioate, and equivalents thereof.

Suitable inert solvents which can be employed herein, are: t-butanol, dimethyl formamide, dimethoxy ethane, tetrahydrofuran and benzene. Sufficient solvent is provided during reaction so as to solubilize the phosphoramidothioate which is herein treated.

Illustrative strong bases contemplated are: the alkali metal alkoxides, such as sodium methoxide, potassium ethoxide and potassium t-butoxide; alkyl lithium, such as butyl lithium, propyl lithium or pentyl lithium; and alkali metal hydrides, such as sodium hydride or lithium hydride. Usually, approximately one to two mols or more of the strong base are provided per mol of the phosphoramidothioate to be alkylated.

In general, a wide variety of alkylating agents can be employed. These are, for instance, alkyl halides, such as methyl chloride, methyl iodide, methyl bromide, ethyl chloride; alkenyl halides, such as allyl chloride or allyl bromide; alkyl ester halides, such as methyl chloroacetate, ethyl bromoacetate; alkyl sulfates, such as dimethyl sulfate or diethyl sulfate, alkyl sulfonates, such as methyl benzenesulfonate, and equivalents thereof. Usually, one mol to two mols can be utilized per mol of phosphoramidothioate being alkylated.

In order to facilitate a further understanding of the invention, the following examples are presented primarily for the purpose of illustrating certain more specific details thereof. The scope of the invention is not to be deemed limited thereby except as defined in the claims. Unless otherwise stated, the parts are by weight.

EXAMPLE 1

Preparation of O,O-diethyl,N,N-dimethyl phosphoramidothioate

In a suitable reaction vessel, 4.8 parts of O,O-diethyl, N-methyl phosphoramidothioate (0.032 mol) are dissolved in 100 parts by volume of tert.-butyl alcohol containing 0.036 mol of potassium tert.-butoxide. After ten minutes, 5.17 parts or 0.036 mol of methyl iodide are added, the solution is stirred for fifteen minutes, 5 to 10 parts of water are added and the mixture is extracted with chloroform. The chloroform layer is dried over magnesium sulfate and evaporated to give 5.3 parts (100%) of O,O-diethyl,N,N-dimethyl phosphoramidothioate, identical in infrared (I.R.) spectrum and gas, liquid phase chromatography (G.L.P.C.) behavior with an authentic sample prepared from dimethylamine and O,O-diethyl phosphorochloridothioate.

EXAMPLE 2

*Preparation of O,O-diethyl,N,N-dimethyl phosphoramidothioate*

O,O-diethyl, N-methyl phosphoramidothioate (8.7 parts or 0.047 mol) is added under a nitrogen atmosphere to a stirred suspension of sodium hydride (0.85 part or 0.068 mol) in 90 parts by volume of dimethoxyethane. After stirring for twenty minutes, methyl iodide (8.0 parts) is added. 50 parts of water are added after three hours. This addition dissolves excess sodium hydride, followed by further addition of 150 parts by volume of methylene chloride and 150 parts of water. Resultant methylene chloride layer is washed with water and dried over magnesium sulfate. Evaporation of the solvent leaves as a residue 7.1 parts of the desired O,O-diethyl, N,N-dimethyl phosphoramidothioate.

EXAMPLE 3

*Preparation of O,O-diethyl, N-methyl, N-phenyl phosphoramidothioate*

O,O-diethyl, N-phenyl phosphoramidothioate (8.12 parts or 0.038 mol) is added to a solution of potassium tert.-butoxide (0.038 mol) in 100 parts by volume of tert.-butanol. After stirring for twenty-five minutes, a solution of dimethyl sulfate (4.78 parts or 0.038 mol) in 15 parts by volume of tert.-butanol are added. After fifteen minutes, water is added, the mixture extracted with chloroform and the product isolated as above to give 8.4 parts of crude product which is evaporatively distilled at 85° C. 20μ pressure) to give 5.81 parts (62%) of pure O,O-diethyl, N-methyl, N-phenyl phosphoramidothioate, identical with the authentic sample of the same.

EXAMPLE 4

*Preparation of O,O-diethyl, N,N-diallyl phosphoramidothioate*

O,O-diethyl phosphoramidothioate (3.72 parts or 0.022 mol) is dissolved in 25 parts by volume of dimethyl formamide and added to a solution of potassium t-butoxide (2.46 parts or 0.022 mol) dissolved in 100 parts by volume of dimethyl formamide. A dark yellow solution is obtained. After six minutes, 3-bromopropene (2.66 parts or 0.022 mol) is dissolved in 25 parts of dimethyl formamide and added to the solution which becomes coludy. After six minutes, a second equivalent of potassium t-butoxide (2.46 parts or 0.022 mol) is dissolved in 50 parts by volume of dimethyl formamide and added to the mixture. At this point, the mixture turns orange. After four minutes, a second equivalent of 3-bromopropene (2.66 parts or 0.022 mol) is dissolved in additional solvent and again is added to the mixture. The mixture is stirred for approximately one hour and methylene chloride (200 parts by volume) is added thereto. Resultant methylene chloride solution is washed several times with water and then dried with anhydrous magnesium sulfate. The latter sulfate is filtered out and the solvent evaporated to yield 12.0 parts of brown liquid containing appreciable solvent.

The crude product (10.0 parts) is vacuum distilled using a vacuum jacketed vigreux column. A few parts of desired product, containing some dimethyl formamide, is obtained at 96° C. and 1.25 mm. Hg. This product is dissolved in 25 parts by volume of methylene chloride, washed twice with water and dried with anhydrous magnesium sulfate. The drying agent is filtered out and the solvent evaporated to yield 0.7 part of pale yellow liquid. Upon analysis, the following is found in percent:

Calculated for $C_{10}H_{18}PNSO_2$: C, 49.6; H, 7.3; P, 12.5; N, 5.7; S, 13.0. Found: C, 48.92; H, 7.46; P, 12.79; N, 5.65; S, 13.29.

EXAMPLE 5

*Preparation of O,O-diethyl, N-methyl-N-carbomethoxymethyl phosphoramidothioate*

A solution of O,O-diethyl, N-methyl phosphoramidothioate (3.92 parts or 0.022 mol) in 50 parts by volume of dimethyl formamide is added to a solution of 0.022 mol of potassium t-butoxide in 100 parts of dimethyl formamide. After ten minutes, methyl chloroacetate (2.38 parts or 0.022 mol) is added and the mixture stirred for one-half hour. Methylene chloride is then added, the solution washed several times with water and dried over magnesium sulfate. Evaporation of the solvent leaves 3.8 parts or 0.0149 mol of O,O-diethyl, N-methyl-N-carbomethoxymethyl phosphoramidothioate as a yellow liquid.

We claim:

1. A process for preparing a N-alkylated phosphoramidothioate which comprises the steps of bringing into reactive combination: (*a*) a N-unsubstituted phosphoramidothioate of the structure:

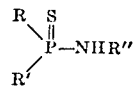

wherein R and R' are each represented by a radical selected from the group consisting of lower alkyl, lower alkoxy phenoxy and naphthoxy, and R" is a substituent selected from the group consisting of hydrogen, lower alkyl phenyl and naphthyl, in the presence of an inert solvent thereof, and a strong base selected from the group consisting of alkyl lithium, an alkali metal alkoxide and an alkali metal hydride, and (*b*) an alkylating agent of the structure:

selected from the class consisting of methyl chloride, methyl iodide, methyl bromide, ethyl chloride, allyl chloride, allyl bromide, methyl chloroacetate, ethyl bromoacetate, dimethyl sulfate, diethyl sulfate and methyl benzenesulfonate, where R''' is the cation and X is the anion of said alkylating agent, and thereafter recovering a N-alkylated phosphoramidothioate of the structure:

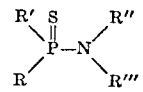

wherein R, R', R" and R''' are all as defined above.

2. A process according to claim 1, in which the N-unsubstituted phosphoramidothioate is O,O-diethyl, N-methyl phosphoramidothioate and the alkylating agent is methyl iodide.

3. A process according to claim 1, in which the N-unsubstituted phosphoramidothioate is O,O-diethyl, N-phenyl phosphoramidothioate and the alkylating agent is dimethyl sulfate.

4. A process according to claim 1, in which the N-unsubstituted phosphoramidothioate is O,O-diethyl phosphoramidothioate and the alkylating agent is allyl bromide.

5. The process according to claim 1, in which the N-unsubstituted phosphoramidothioate is O,O-diethyl, N-methyl phosphoramidothioate and the alkylating agent is methyl chloroacetate.

6. A process according to claim 1, in which the strong base is potassium t-butoxide.

7. A process according to claim 1, in which the strong base is butyl lithium.

8. A process according to claim 1, in which the strong base is sodium hydride.

9. A process according to claim 1, in which the inert solvent is dimethyl formamide.

10. A process according to claim 1, in which the inert solvent is t-butanol.

11. A process according to claim 1, in which the inert solvent is dimethoxyethane.

References Cited by the Examiner

UNITED STATES PATENTS

| | | | |
|---|---|---|---|
| 2,867,658 | 1/59 | Frick | 260—551 |
| 2,894,019 | 7/59 | Maeder | 260—461.106 |
| 2,939,849 | 6/60 | Frick et al. | 260—461.306 |
| 2,965,666 | 12/60 | Debo | 260—461.106 |

OTHER REFERENCES

Fones: "J. Org. Chem.," volume 14, pages 1099–1102 (1949).

Groggings: "Unit Processes in Organic Synthesis," 3rd Edition (1947), McGraw-Hill Book Company, Inc., New York, N.Y., pages 563–573.

CHARLES B. PARKER, *Primary Examiner.*

LEWIS GOTTS, *Examiner.*